United States Patent [19]
Williams et al.

[11] Patent Number: 5,590,898
[45] Date of Patent: Jan. 7, 1997

[54] VEHICLE SUSPENSION SYSTEM

[75] Inventors: David A. Williams, Milton Keynes, United Kingdom; Neil Jones, Palm City, Fla.

[73] Assignee: Group Lotus PLC, United Kingdom

[21] Appl. No.: 531,394

[22] Filed: Sep. 21, 1995

Related U.S. Application Data

[63] Continuation of Ser. No. 380,153, Jan. 30, 1995, abandoned, which is a continuation of Ser. No. 145,291, Oct. 28, 1993, abandoned, which is a continuation of Ser. No. 777,557, filed as PCT/GB90/00931 Jun. 15, 1990 published as WO90/15726, Dec. 27, 1990, abandoned.

[30] Foreign Application Priority Data

Jun. 15, 1989 [GB] United Kingdom .................... 8913809

[51] Int. Cl.$^6$ ................................................ B60G 17/015
[52] U.S. Cl. ...................... 280/707; 364/424.046
[58] Field of Search .................................. 280/689, 703, 280/707, 772; 364/424.05

[56] References Cited

U.S. PATENT DOCUMENTS

| | | | |
|---|---|---|---|
| 4,726,453 | 2/1988 | Obstfelder et al. | 280/707 X |
| 4,892,328 | 1/1990 | Kurtzman et al. | 280/707 |

FOREIGN PATENT DOCUMENTS

| | | | |
|---|---|---|---|
| 0114757 | 8/1984 | European Pat. Off. | 280/707 |
| 01919 | 5/1985 | WIPO | 280/707 |
| 06807 | 11/1986 | WIPO | 280/707 |
| 00512 | 1/1989 | WIPO | 280/707 |
| 15726 | 12/1990 | WIPO | 280/707 |

*Primary Examiner*—Andrew C. Pike
*Attorney, Agent, or Firm*—Westman, Champlin & Kelly, P.A.

[57] ABSTRACT

A vehicle suspension device includes a plurality of hydraulic actuators which in use support the sprung mass of the vehicle relative to the wheel and hub assemblies of the vehicle. Each hydraulic actuator is part of a single vehicle suspension device which includes a signal processor device for processing signals corresponding to a plurality of variable perimeters of the vehicle's behavior and for producing a signal to control the extension and the contraction of the hydraulic actuator. A central processor communicates with all of the vehicle suspension devices and processes signals corresponding to a plurality of variable perimeters of the vehicle's behavior and produces control signals to control the extension and contraction of each actuator.

6 Claims, 7 Drawing Sheets

VEHICLE SUSPENSION SYSTEM

This is a continuation of application Ser. No. 08/380,153, filed Jan. 30, 1995, now abandoned which was a continuation of application Ser. No. 08/145,291, filed Oct. 28, 1993, now abandoned which was a continuation of application Ser. No. 07/777,557, filed as PCT/GB90/00931 Jun. 15, 1990 published as WO90/15726, Dec. 27, 1990, now abandoned.

BACKGROUND

This invention relates to a vehicle suspension device, and particularly to such a device for use in the suspension system of a vehicle having a so-called active suspension system.

In European Patent Publi. No. 0114757 there is disclosed a wheeled land vehicle having an active suspension system including suspension devices in the form of hydraulic actuators by which the wheels (unsprung mass) of the vehicle are mounted to the body (sprung mass) of the vehicle. The suspension devices are controlled by signals representing heave, pitch, roll and warp modes of movement of the vehicle, possibly modified by signals representing the speed and lateral and longitudinal acceleration of the vehicle, to obtain a desired ride quality and attitude for the vehicle, the signals being derived from appropriate transducers located at appropriate positions on the vehicle.

In U.S. Pat. No. 4,761,022 there is disclosed a similar control system which also includes steering angle and yaw rate sensors on the vehicle, the signals from these sensors being used to control the steering characteristics of the vehicle.

Various such active suspension systems have been proposed, and a common feature of all known systems is that the necessary processing of the signals from the various transducers and the like around the vehicle is carried out centrally in a single common processing means such as a microprocessor, the signals from the transducers being transmitted to the processing means which in response thereto transmits control signals to the suspension devices to affect the necessary control thereof.

SUMMARY OF THE INVENTION

According to this invention there is provided a vehicle suspension device comprising an actuator serving in use to support at least part of the sprung mass of a vehicle relative to the unsprung mass thereof, the actuator being responsive to signals generated in dependence upon the values of a plurality of variable parameters of the vehicle's behaviour, the device including signal processing means in which at least some of the signals are processed.

Thus, with the suspension device of the invention some signal processing is carried out locally at the suspension device thus reducing the amount of signal transmission between the suspension device and a central processing means, this in turn reducing the number of communication links, for example wires or optical links, that need be provided.

In vehicles with active suspension systems there are generally parameter responsive local transducers individually associated with each suspension device, for example a load cell measuring the load on the device, a transducer measuring the displacement of the device and an accelerometer measuring the vertical acceleration of the wheel and hub assembly suspended by the device, and thus in such a vehicle equipped with a suspension device according to this invention, signals deriving from local transducers monitoring parameters of the vehicle's behaviour are processed in the processing means of the device, while signals deriving from other such transducers, for example yaw rate sensors, steering angle sensors, and vehicle speed and lateral and longitudinal acceleration sensors, are processed centrally. Clearly signals can be transmitted from the central processing means to the processing means of the suspension device to modify the processing carried out thereby, if necessary.

The suspension device of the invention has the advantage that it provides good reliability in view of the reduced need for signal transmission about a vehicle using the device, this reduced transmission need also giving the advantage, noted above, of reduced wiring requirements and thus giving a reduction in the weight and bulk of the necessary equipment. Further, the suspension device of the invention can provide for the possibility of local diagnostic testing of the device thus simplifying such testing on a vehicle.

BRIEF DESCRIPTION OF THE DRAWINGS

Preferred embodiments of the invention will now be described by way of example with reference to the drawings in which.

DETAILED DESCRIPTION OF THE PREFERRED EMBODIMENTS

Figure 1:
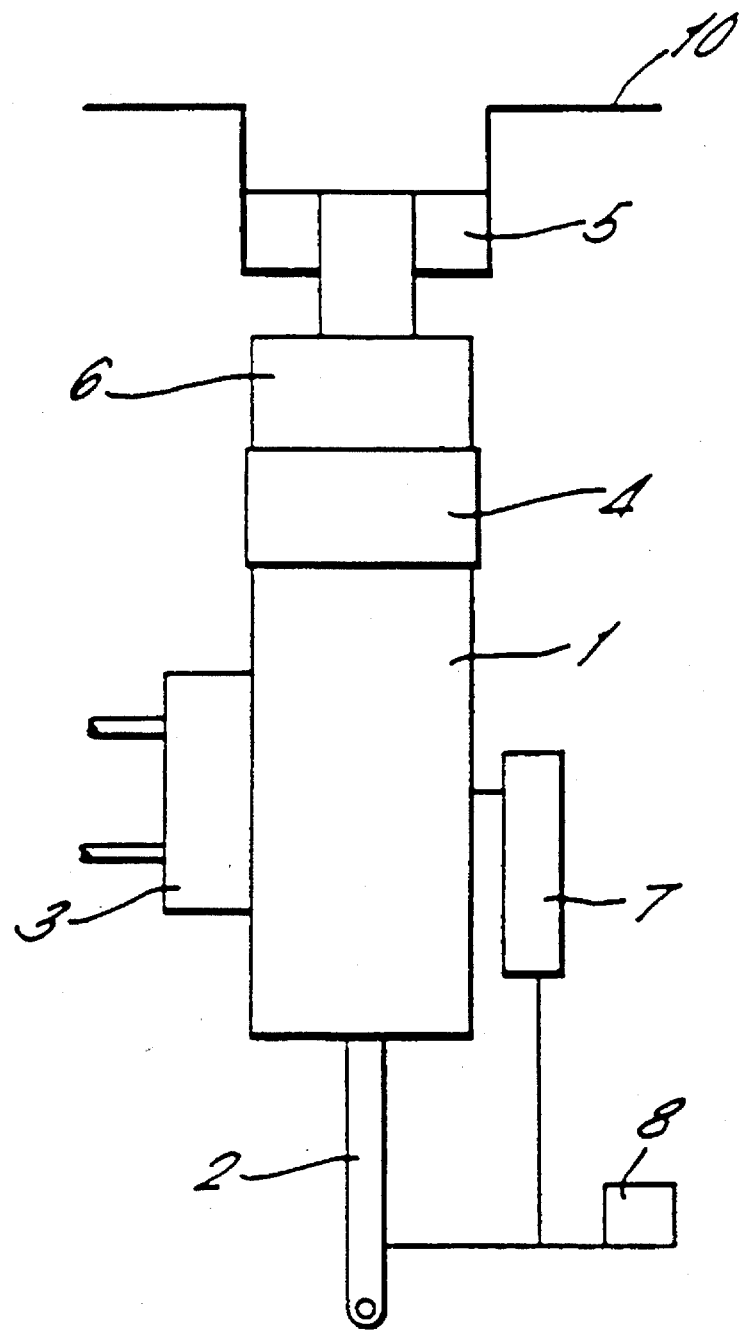
FIG. 1 is a diagrammatic side elevational view of a hydraulic actuator used in the invention.

FIG. 1 shows a hydraulic actuator suspension device, for example as described in the European patent application Publication No. 2003636 which claims priority from British Patent Application No. 8827745.4, for use in an active vehicle suspension system, for example as described in European Patent Publication No. 0114757. The device comprises a double-acting actuator having a cylinder 1 containing a piston (not shown) having a connecting rod 2 extending out of the cylinder 1 for connection to a wheel and hub assembly of a vehicle. The device also includes valving 3 by which hydraulic fluid pressure can be applied to both sides of the piston thereby to move the piston within the cylinder 1. Such a suspension device is fully described in the above noted British Patent Application No. 8827745.4, and will not therefore be described in any more detail herein.

The cylinder 1 carries a load cell 6 serving to measure the force between the cylinder 1 and the body 10 of the vehicle to which the device is, in use, connected by way of a resilient (rubber) isolator member 5, a processing means 4 in the form of a microprocessor being located beneath the load cell 6 and the isolation member 5. Associated with the device is a displacement transducer 7 serving to monitor the displacement of the piston within the cylinder 1, and an accelerometer 8 serving to monitor the vertical acceleration of the wheel and hub assembly carried by the device. Signals from the transducers 6, 7, and 8, and possibly other local or remote transducers not shown, are transmitted to the processing means 4 over wiring in the device, and are there processed, possibly together with signals from a central processing means (not shown) common to all of the suspension devices of the vehicle, to provide control signals for the valving 3 thereby to control the suspension characteristics of the vehicle as required.

Although in the device described above the force acting between the sprung mass of the vehicle and the unsprung mass carried by the device is measured by means of a load cell transducer 6, it will be appreciated that if friction within the device is relatively low the load cell can be dispensed with and the necessary force signals derived from the differential pressure within the cylinder of the device, the device thus in effect functioning as the necessary force measuring transducer.

Further, although the only transducer shown directly mounted on the cylinder 1 with the processsing means 4 is the load cell 6, it will be appreciated that the transducers, for example the accelerometer 8, can be similarly mounted, this giving the advantage of a reduction in the lengths of the connections to the processing means 4.

By the current invention there is provided an active suspension system ideally suited for production in which the components are arranged in compact and relatively inexpensive groups, each group being packaged as an autonomous exchangeable unit. Each group arrangement is known as a line replaceable unit (LRU). An LRU must be designed so that it can be tested fully and calabrated in isolation. The invention allows a system wherein communications between individual LRUs can be minimised, since the active suspension system possesses a distributed processing capability.

Figure 2:
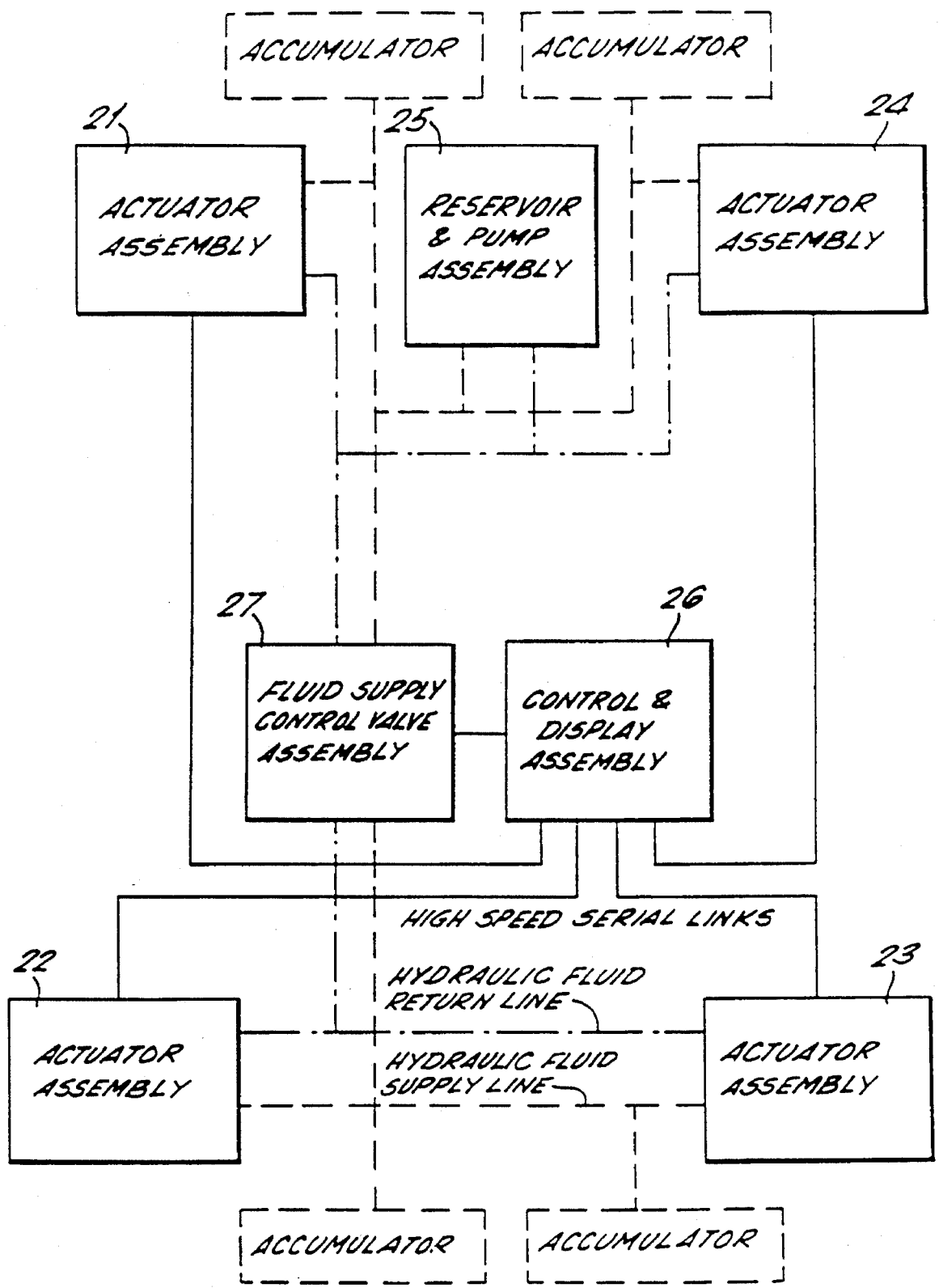
FIG. 2 is a schematic diagram of the distributed active suspension system according to the invention.

The present invention comprises a system composed of seven LRUs of four different types. A preferred embodiment of the arrangement is shown in FIG. 2. The system comprises four similar actuator assemblies 21, 22, 23, and 24, a hydraulic fluid resevoir and pump assembly 25, a central control and display assembly 26, and a fluid supply control valve assembly 27. Whilst this is a preferred embodiment of the invention it is conceivable that at least two of the LRUs could be combined into a single assembly.

There shall now follow a description of each of the LRUs which comprise the preferred embodiment of the present invention.

Figure 3:
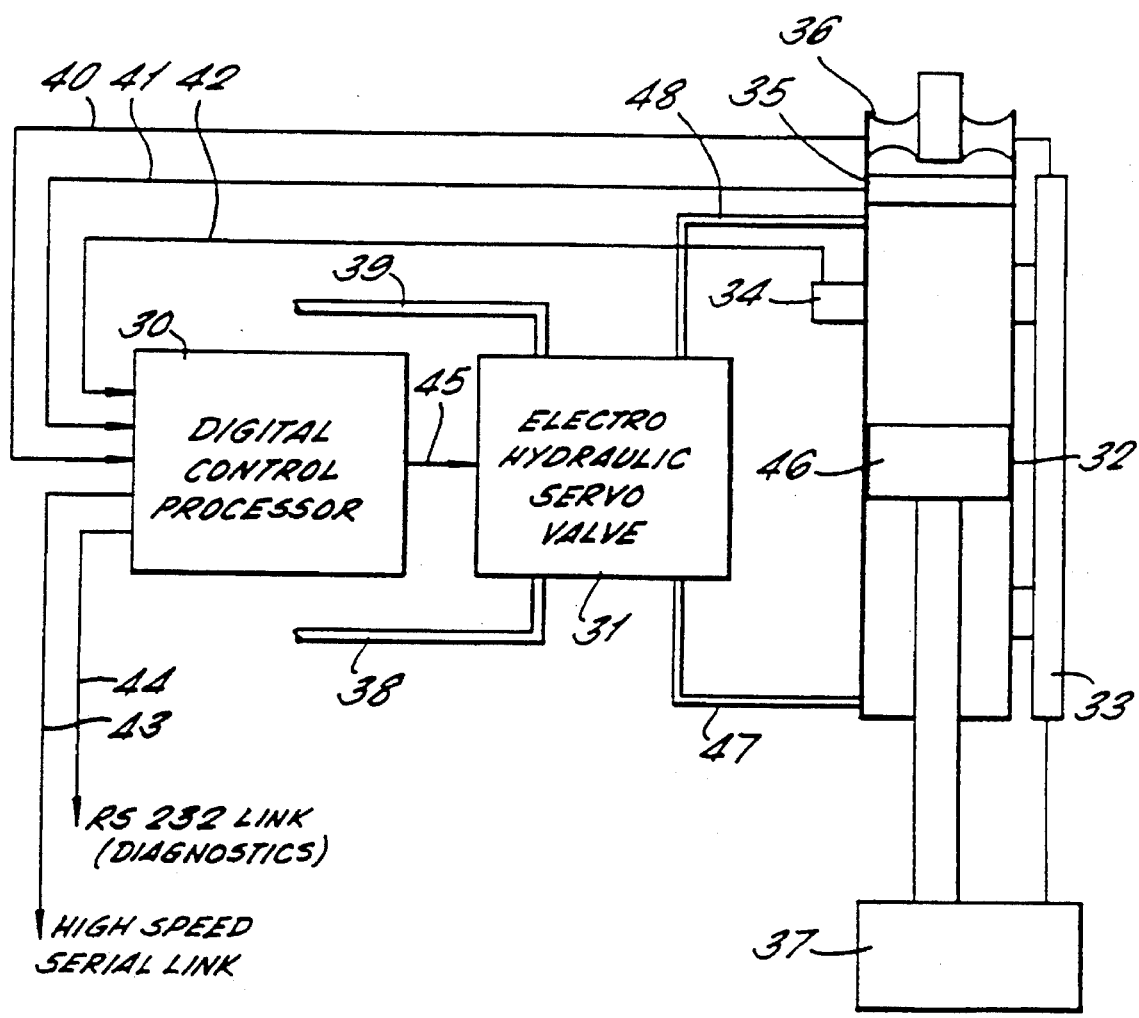
FIG. 3 is a schematic diagram of a suspension unit according to the invention.

In FIG. 3 there is shown a schematic diagram of an actuator assembly. The actuator assembly comprises a digital control processor 30, an electro-hydraulic servo-valve (EHSV) assembly 31, a hydraulic ram 32, an actuator position transducer 33, a linear accelerometer 34, and a load cell 35. In one embodiment of the invention the hydraulic ram 32 can be as previously described in reference to FIG. 1 and as discussed in the above noted British patent application no. 8827745.8. The hydraulic ram 32 is not directly attached to the unsprung mass of the vehicle, but is connected to an isolator 36 positioned between the hydraulic ram and the unsprung mass of the vehicle. The isolator is included in the preferred embodiment of the invention since the operation of the hydraulic ram 32 may not be quick enough to totally prevent all shocks being transmitted from a wheel and hub assembly of the vehicle to the chassis thereof. A wheel and hub assembly of the vehicle can be seen schematically represented as 37 in FIG. 3.

It can be seen from FIG. 3 that two hydraulic lines are connected to the EHSV 31. A fluid supply line 38 supplies hydraulic fluid under pressure to the EHSV 31. The fluid return line 39 returns hydraulic fluid from the EHSV.

As can be seen in FIG. 3 the measurements taken by the actuator position transducer 33, the linear accelerometer 34, and the load cell 35 are transmitted to the digital control processor 30 by the connecting lines 40, 42, and 41. These connections are commonly electrical connections, but can equally be optical fiber links.

The digital control processor 30 is connected to the central control processor of the active suspension system via the link 43. Link 43 is a high speed serial link.

The digital control processor 30 controls the EHSV 31, so as to control the supply of hydraulic fluid to the hydraulic ram 32. Hydraulic fluid is supplied to either side of the piston 46 of the hydraulic ram 32 by two hydraulic supply lines 47 and 48. The EHSV is controlled so as to connect one of the supply lines 48 or 47 to the supply line 38 of hydraulic fluid under pressure or to the fluid return line 39. In this way, the movement of the hydraulic ram 32 can be easily controlled.

Figure 4:
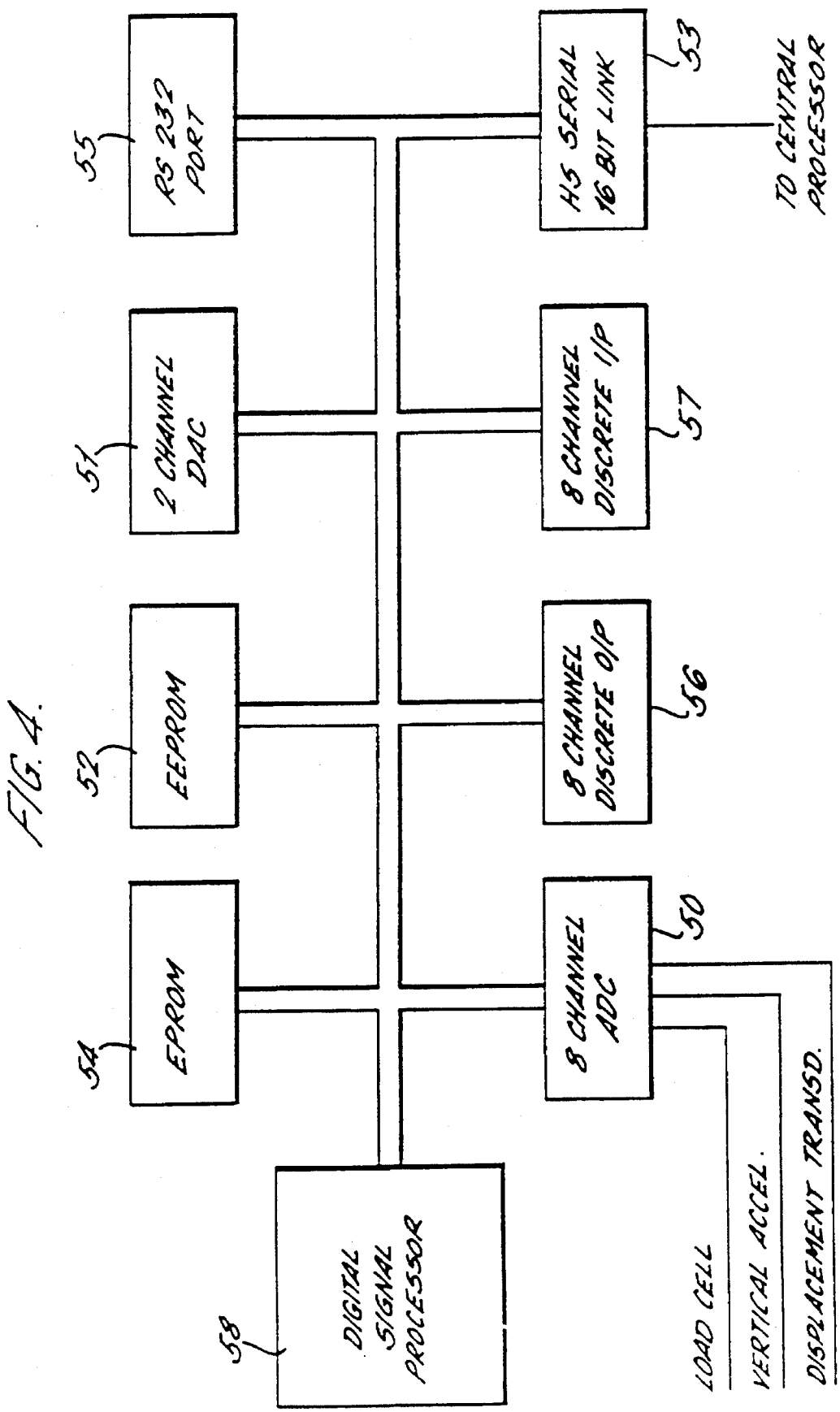
FIG. 4 is a schematic diagram of an embodiment of a digital control processor according to the invention.

The internal architecture of the digital control processor 30 can be seen in FIG. 4. The digital control processor comprises an eight channel analogue to digital convertor (ADC) 50, a two channel digital to analogue convertor 51, a non-volatile segment of data memory (EEPROM) 52, a high speed serial channel 53, a non-volatile executable segment program memory (EPROM) 54, a low speed serial channel (represented by the RS232 port 55), an eight channel discrete output port 56, and an eight channel discrete input port 57. All of the components are interfaced to a high speed digital signal processor (DSP) 58.

The RS232 link is not used in the operational mode of the active suspension system. It is provided so that diagnostic messages stored in the EEPROM 52 can be interrogated by a service computer, should a fault in the system arise and adjustments be necessary.

Figure 5:
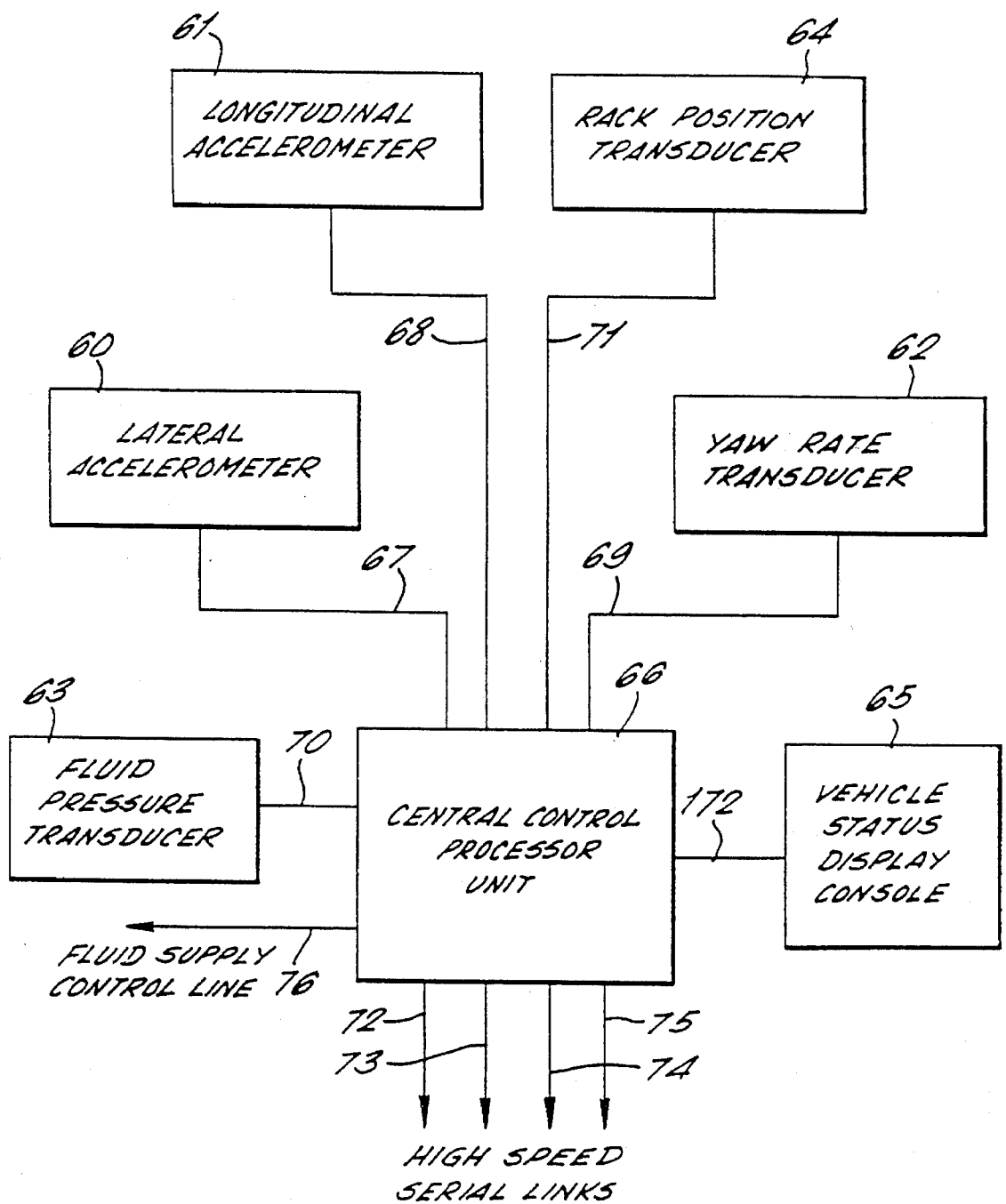
FIG. 5 is a schematic diagram showing the inputs to a central control processor according to the invention.

A central control and display assembly (shown as 26 in FIG. 2) according to the invention can be seen in FIG. 5. The assembly comprises a lateral accelerometer 60, a longitudinal accelerometer 61, a yaw rate transducer 62, a hydraulic fluid pressure transducer 63, a steering rack position transducer 64 a display unit 26, and a central control processer unit 66.

The longitudinal accelerometer 61 measures the acceleration of the vehicle in a direction parallel to the principal axis of the vehicle body. The lateral accelerometer 60 measures the acceleration of the vehicle perpendicular to the principal axis of the chassis, that is to say the acceleration that the vehicle experiences when cornering. The rack position transducer 64 measures the position of the steering rack of a vehicle to determine the steer angle of the vehicle. The yaw rate trandsucer 62 measures the speed of rotation of the vehicle about an axis perpendicular to the plane of the vehicle, such rotation occurring upon cornering. The fluid pressure transducer 63 measures the pressure of the hydraulic fluid within the active suspension system. All of the sensors 60 to 64 transmit signals corresponding to the measured parameters via a plurality of connecting links 67 to 71, to the central control processor unit 66. The central control processor unit 66 transmits control signals to the four actuator assemblies by the control lines 72 to 75. Obviously each actuator assembly is substantially similar to that hereinbefore described with reference to FIGS. 3 and 4, each actuator assembly being preferably positioned at one corner of the vehicle body.

The central control processor unit also transmits the signal via a line 76 to control the supply of pressurised hydraulic fluid to the actuators. The control links can be seen also in FIG. 2, previously described.

Figure 6:
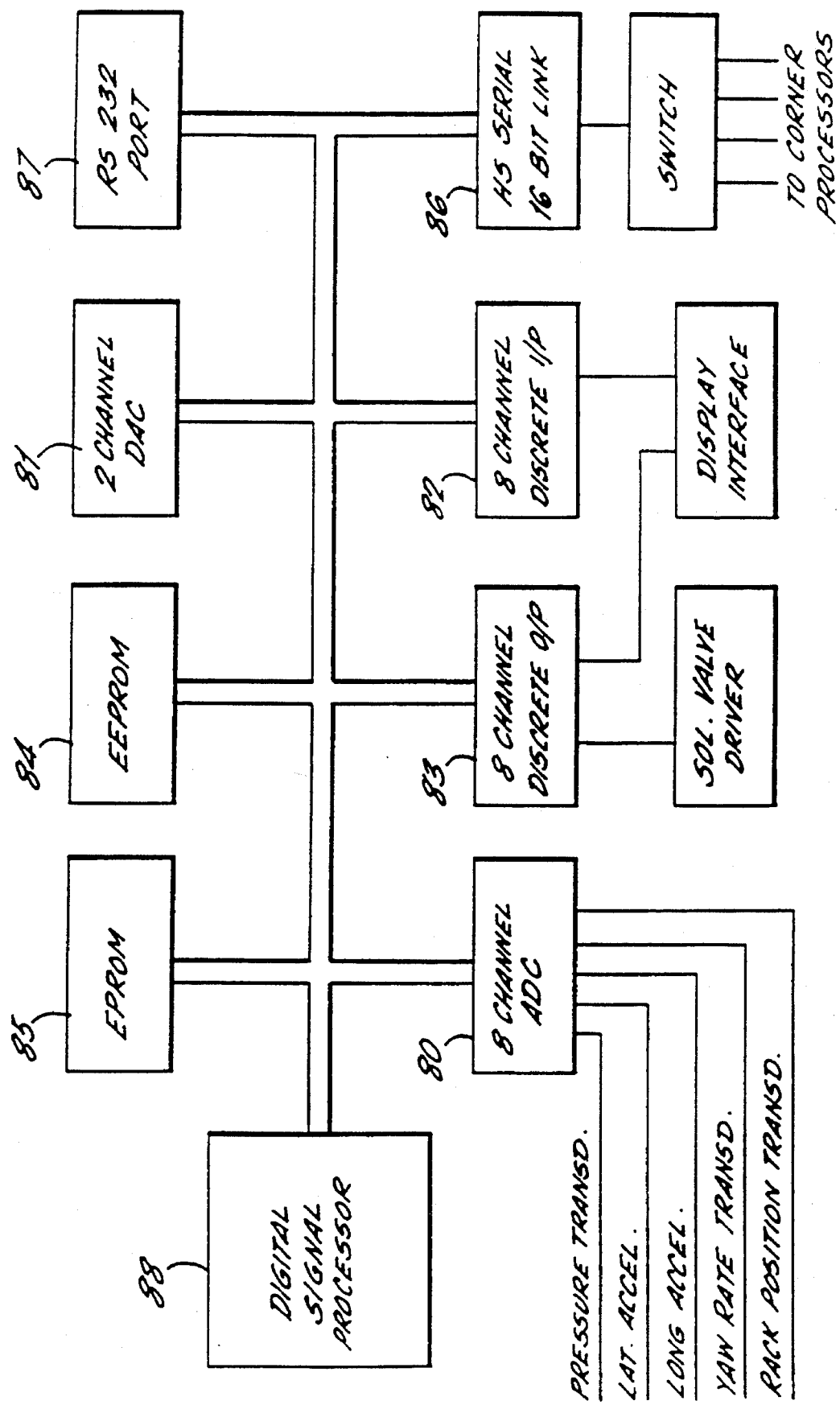
FIG. 6 is a schematic diagram showing the architecture of a central control processor unit according to the invention.
Figure 7A:
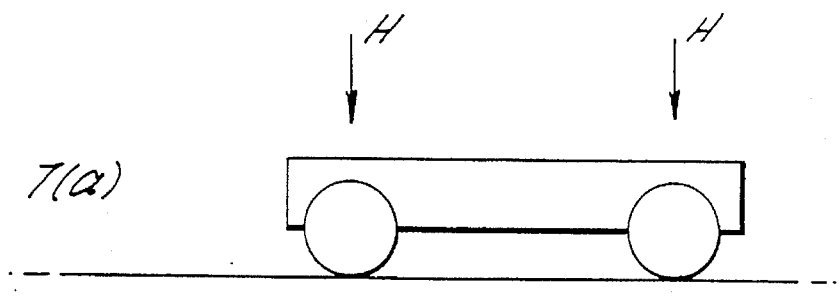
FIGS. 7(a)–7(d) are schematic diagrams showing the four modal forces that act on a vehicle body that are considered by the central control processor.
Figure 7B:
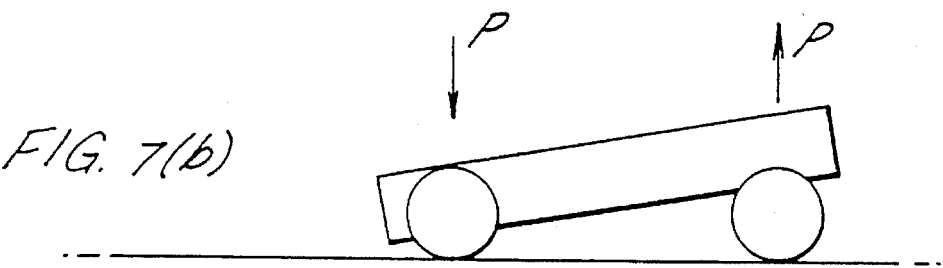
Figure 7C:
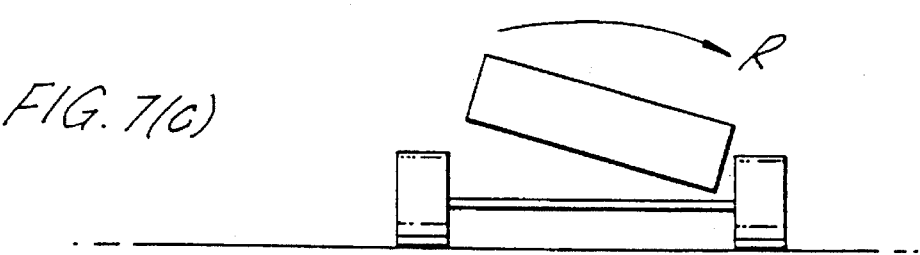
Figure 7D:
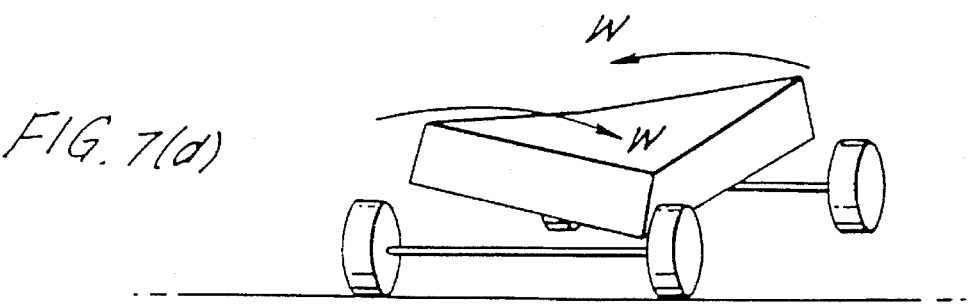

FIG. 6 is a schematic diagram of the internal architecture of the central control processor unit shown in FIG. 6. The central control processor unit 66 can be seen to comprise an eight channel analogue to digital convertor 80, a two channel digital to analogue convertor (DAC) 81, an eight channel discreet input latch 82, an eight channel discreet output latch 83, a non-volatile segment of data memory (EEPROM) 84, a non-volatile segment of program memory (EPROM) 85, a high speed serial channel 86, and a low speed serial channel, represented by the RS232 port 87. All of the components mentioned previously in this paragraph are interfaced to a high speed digital signal processor (DSP) 88. The signals from the sensors 60–64 are converted from analogue signals to digital signals by the eight channel analogue to digital convertor 80. The inputs are then processed by the central control processor unit, which derives control outputs and also outputs signals to a vehicle status display console 65 on line 172. Various vehicle parameters can be displayed on the vehicle status display console as required.

As with the actuator assembly the central control processor unit can be serviced by connecting a service computer to the processor via the RS232 port 87.

As can be seen in FIG. 2 the reservoir and pump assembly is required to deliver filtered fluid under pressure into the fluid supply line via a non-return valve for distribution to the actuator assemblies 21, 22, 23, and 24. It has been assumed, for the purposes of this document, that the fluid in the reservoir will be at atmospheric pressure and that the pump will be driven from the vehicle engine. The pump preferably contains a self-contained pressure control circuit to sustain an approximately constant pressure in the fluid supply line. In working models the normal supply pressure has been set to 175 bar.

The fluid supply control valve assembly 27 contains a solenoid valve and a supply pressure transducer. The solenoid valve is connected between the fluid supply and return lines and is arranged so that the fluid supply will be connected directly to the return line unless the solenoid valve is energised. The arrangement is designed so that the suspension system will be held at low pressure unless or until the solenoid valve is energised. The fluid supply pressure transducer is connected hydraulically to the fluid supply line. The measured signal from the pressure transducer is sent to the central control and display assembly. The solenoid valve within the control valve assembly is directly controlled by the central control and display assembly 26.

The hydraulic ram mentioned above could be an equal area ram or an unequal area energy saving ram and described in the prior art or in fact any suitable electro hydraulic device.

The load cell shown inserted between the hydraulic ram and the sprung mass of the vehicle may be replaced by two pressure transducers monitoring fluid pressure on either side of the piston. When pressure transducers are used these are monitored by the digital control processor and the control software is modified so as to use the pressure transducer output signals to derive an estimate of the load reacted by the ram. As previously described the vertical accelerometer was shown attached to the cylinder of the hydraulic ram. The accelerometer however could also be used attached to the wheel and hub assembly of the vehicle. However, it is preferred that the accelerometer is attached to the cylinder of the hydraulic ram since the arrangement facilitates that manufacture of a single compact actuator assembly. The arrangement requires the existance of an isolator attached to the cylinder rather than the piston rod.

Now that the hardware of the distributor system has been described, the software controlling the hardware shall be explained.

The algorithms used for controlling each actuator simulate four independent (corner) springs and dampers. The processor calculates a corrected load term $F_c$, where:

$$F_c = F_r + M_m \cdot DDX_U + P_{sp} \cdot X_r + F_{cor}$$

where $F_c$ is the corrected load to be used in the simulation
$F_r$ is the measured load
$DDX_U$ is the measured vertical hub acceleration
$X_r$ is the measured actuator position
$M_m$ is a parameter proportional to hub mass
$P_{sp}$ is a passive spring correction parameter
$F_{cor}$ is an imported force correction term.

The passive spring correction parameter is necessary when the actuator assembly is mounted in parallel with a spring and therefore the load transmitted to the chassis via the spring is not measured. The algorithm assumes that the passive spring correction can be effected in isolation for each actuator and that there is no cross coupling between actuators, for instance by passive anti-roll bars.

The force correction term is necessary to account for unmeasured loads transmitted to the vehicle body, such loads being transmitted by paths not including the means for measuring the forces, such loads commonly being transmitted through imperfections in the suspension geometry. The force correction term also counteracts forces measured by the suspension unit which should not be measured and occur because of the imperfect nature of the mechanical suspension systems commonly used in automobiles. In such systems lateral force acting on the tyres of the vehicle forms a moment about a suspension arm of the suspension linkage and therefore some of the force is transmitted through the actuator. The actuator should not deflect in response to such loading.

A velocity parameter is calculated from the corrected load term as follows:

$$DX_C = (IC_{cs})^{-1} \cdot (F_c - K_{cs} \cdot X_d)$$

where $DX_C$ is the velocity parameter
$(IC_{cs})^{-1}$ is the inverse of simulated damping
$K_{cs}$ is the simulated stiffness
$X_d$ is integral of $DX_d$ (defined later) over time.

The velocity parameter is then high pass filtered, in order to ensure that the average velocity demanded of the hydraulic ram by the control processor is zero. This ensures that over a period of time the actuator has a mean displacement of zero. A simple algorithm for effecting a single pole high pass filter is as follows:

$$DX_{cl} = DX_{cl} + K_{ml} \cdot (DX_c - DX_{cl})$$

$$DX_{ch} = DX_c - DX_{cl}$$

where $DX_{ch}$ is the high pass filtered velocity parameter
$DX_{cl}$ is the low pass filtered velocity parameter
$K_{ml}$ is the low pass filter constant.

The performance of the simulated suspension is enhanced by adding to the velocity parameter an additional velocity parameter proportional to the unsprung mass inertial velocity. In the suspension system the unsprung masses are the wheel and hub assemblies. The unsprung mass inertial velocity is estimated by integrating the output from a hub accelerometer. Any transducer offset is eliminated from the estimate by using a scaled two pole high pass filter as the integration element. The algorithm used is as follows:

$$DX_u = K_{v1} \cdot DX_u + K_{v2} \cdot (DDX_U + DDX_{uI} - 2 X_u)$$

$$X_U = X_U + K_{v3} \cdot DX_U$$

$$DDX_{uI} = DDX_u$$

where $DX_U$ is the estimated hub inertial velocity $X_U$ is the estimated hub inertial position $DDX_{UI}$ is the hub acceleration retained from the previous iteration $K_{v1}$, $K_{v2}$, and $K_{v3}$ are filter constants.

When the vertical accelerometer is mounted on the actuator cylinder as can be seen in FIG. 3 then the estimate of hub velocity must be modified to include an estimate of actuator velocity. The estimate of actuator velocity may be derived by scaling the required actuator velocity calculated or by differentiating measured actuator position. If differentiation is the preferred technique then an estimate of actuator velocity is generated by the following algorithm:

$$DX_r = K_{X1} \cdot DX_r + K_{x2} \cdot (X_r - X_{rpp})$$

$$X_{rpp} = X_{rp}$$

$$X_{rp} = X_r$$

where $DX_r$ is the estimated actuator velocity $X_r$ is measured actuator position (current)

$X_{rp}$ is measured actuator position (last)

$X_{rpp}$ is measured actuator position (last but one)

$X_{X1}$ and $K_{X2}$ are filter constants.

It should be noted that the scaling of the filter set by the filter constant $K_{X2}$ must match the scaling of the inertial velocity estimator, taking account of transducer sensitivities.

From the above the velocity demanded of the actuator is calculated by the control processor from the suspension simulation and can be written:

$$DX_d = Q_j \cdot (K_U \cdot DX_U + DX_{ch})$$

where $DX_d$ is the simulation velocity demanded $K_U$ is the unsprung mass velocity weight $Q_j$ is the "Bump Stop" weight.

The term $Q_j$ is included in a preferred embodiment of the invention, but is not necessary to the invention. It weights the velocity demand, to reduce the velocity demand as the actuator reaches the limits of extension and contraction. It therefore prevents sudden discontinuities in movement of the hydraulic ram.

As mentioned before the actuator unit outputs a velocity signal which averages to zero. In other words, over a long period of time the average displacement of the hydraulic ram is zero. It is the function of the central control assembly to vary the mean position so as to account for dynamic loading on the vehicle, that is to say that a rise from cornering, acceleration, deceleration, etc. The required position of the actuator is received from the central control assembly. It is used in a simulation of a model actuator complete with a postion error control loop. The algorithm is as follows:

$$DX_b = K_b \cdot (X_b - X_p')$$

$$X_b = X_b + I_{gn} \cdot DX_b$$

where $DX_b$ is the Offset velocity $X_b$ is the Offset position $X_p'$ is the required average actuator position $K_b$ is a position error loop gain $I_{gn}$ is the equivalent to the actuator gain.

The required actuator velocity and position are computed as:

$$DX_o = DX_d + DX_b$$

$$X_o X_d + X_b$$

The actuator and its current associated amplifier may also have a small offset which will be a function of temperature and other such external factors. Such a bias will require an additional term if a zero velocity demand is to result in a zero actuator velocity. An estimate of the value of the bias can be obtained by integrating a difference between the demanded and the measured actuator position as follows:

$$X_c = X_c + K_c \cdot (X_o - X_r)$$

where $X_c$ is the estimate of bias $K_c$ is an integration constant.

The integration constant should be sufficiently small not to intefere with the suspension simulation. In a preferred embodiment the algorithm is only executed when the vehicle is travelling in a straight line.

The performance of the hydraulic ram is also dependent partly upon the fluid supply pressure. This may vary significantly in an active suspension vehicle and therefore it is necessary to introduce a factor to reduce the variation in performance of the hydraulic ram with changes in supply pressure. The factor used is transmitted from the central control assembly. The final current amplifier input voltage is therefore computed as being:

$$PR_{fact} \cdot [G_f DX_o + G_d \cdot (X_o - X_r)] + X_c$$

where $G_f$ is the forward loop gain $G_d$ is the feedback loop gain $X_r$ is the measured actuator position $PR_{fact}$ is the supply pressure compensation factor.

In the suspension system of the invention the voltage applied to the current amplifier corresponds to velocity of the actuator.

We shall now deal with the functions performed by the central control and display processor. The processor used in the central control and display assembly (CCDA) performs several functions, including formatting a driver display and monitoring the performance and fidelity of the overall system and its components. However, the present invention is only concerned with the control of an active suspension system and hence discussion shall be limited to those algorithms which are executed by the processor and which have a direct effect upon the control of the suspension of the vehicle.

Unlike the active suspension systems of the prior art, the central control processor is not required to correct measured loads to account for unmeasured loads reacted by springs in parallel with the actuators of the vehicle. This is because the unmeasured loads have already been considered by the individual actuator control processor.

The central processor of the invention works in modal co-ordinates. A diagram showing the four modal loads considered by the central processor can be seen in FIG. 7. The central processor considers the forces applied to the vehicle in the following four modes; heave (4a), pitch (4b), roll (4c), and warp (4d). The calculation of these forces is well known and is described in documents such as European Patent Application Publication No. 0236947 in the name of Toyota Jidosha Kabushiki Kaisha.

The central processor calculates modal load correction terms. The modal load correction terms correspond to the modal loads applied to the vehicle by reason of its motion, such loads being experienced by the vehicle during cornering, acceleration, and deacceleration, etc. The modal load correction terms are computed as follows:

$$[F_{crm}]=[P_{in}] \cdot [Y_e] + [P_{ae}] \cdot (kp) + [K_t] \cdot [T_{xm}] \cdot [X_b]$$

The terms used in the above expression are defined as follows:

$[F_{crm}]$ is the vector of modal force corrections
$[Y_e]$ is the transpose of the vector $$[nx+, nx-, ny, Dr]$$

where nx is the longitudinal acceleration of the vehicle
ny is the lateral acceleration of the vehicle
Dr is the yaw rate of the vehicle.
$[X_b]$ is the position offset vector
$[K_t]$ is a diagonal matrix of tire/isolator stiffnesses
$[P_{in}]$ is a matrix of inertia correction coefficients
$[P_{ae}]$ is the vector of aerodynamic coefficients
$[T_{xm}]$ is the position modal transformation matrix
$k_p$ is the vehicle kinematic pressure.

It can be seen that the algorithm calculates loads on the vehicle actioned by lateral acceleration ny, longitudinal acceleration nx, and yaw rate Dr. The processor also calculates loads absorbed by the tires of the isolators of the vehicle. In a preferred embodiment the active suspension system further includes means for measuring the kinematic pressure of the air passing over the vehicle and in such embodiments the central control processor calculates the aerodynamic loads on the vehicle.

The modal correction vector may be transformed into actuator co-ordinates as follows:

$$[F_{cr}]=[T_{xc}] \cdot [F_{crm}]$$

where $[F_{cr}]$ is the vector of actuator force corrections
$[F_{crm}]$ is the vector of modal force corrections
$[T_{xc}]$ is the position modal transformation matrix.

When the suspension is required to simulate "modal" springs and dampers, rather than corner springs and dampers, an additional term is required to be added to the vector of the acutator force corrections before the actuator correction terms can be calculated. The load correction vector is necessary since the corner units consider corner springs and dampers and hence the velocity required of the actuators by the corner processors must be adjusted so that the vehicle suspension as a whole acts in accordance with the desired simulated modal springs and dampers. The correction term is then calculated as the difference between the equivalent loads and the actual loads as follows:

$$[F_{cr}'']=([IC_{cs}]^{-1} \cdot [T_{xc}] \cdot [IC_s] \cdot [T_{fm}]-[I]) \cdot [F_c]$$

where $[F_{cr}'']$ is the vector of additional actuator force corrections $[F_c]$ is the vector of corrected "corner" forces, hereinbefore described $[T_{fm}]$ is the force modal transformation matrix
$[T_{xc}]$ is the position actuator transformation matrix
$[IC_{cs}]$ is the diagonal matrix of simulated actuator dampings
$[IC_s]$ is the diagonal matrix of simulated modal dampings
$[I]$ is the Unit matrix.

It should be noted that the vector of additional actuator force corrections can be considered as being the product of a weighting matrix and the corrected actuator forces, where the co-efficients of the weighting matrix are constant. The co-efficients need only be calculated once and therefore the correction term becomes:

$$[F_{cr}'']=[W_{fc}] \cdot [F_c]$$

with $[W_{fc}]=[IC_{cs}]^{-1} \cdot [T_{xc}] \cdot [IC_s] \cdot [T_{fm}]-[I]$

The additional correction term is usually important only if the required simulating damping characteristics for the vehicle cannot be obtained by suitable settings of the simulated actuator damping co-efficients. If it is necessary to add the term then the stability of the suspension becomes dependent upon the transport delay between sensing and reacting to measured loads of acceleration. In systems which require the additional force correction term, stability can be improved by filtering the additional correction term through a low pass filter. It should be recognized that the term is important only at simulated sprung mass natural frequency. Single pole low pass filters (one for each actuator) could be used, each having a natural frequency in the order of 3 Hz. Expressions for similar low pass filters have been discussed earlier in this document and are therefore not repeated here.

The actuator correction terms are computed and output to the appropriate actuator controller as:

$$[F_{cor}]=[F_{cr}]+[F_{cr}'']$$

The final vector of required average actuator positions to be transmitted to each actuator is effectively composed of three elements. The first element effectively removes from the average actuator position demand the individual simulated actuator stiffnesses, whilst the second element imposes motion corresponding to simulated modal stiffnesses, as mentioned above. The third element superimposes motion required to offset the dynamic loading upon the vehicle, as mentioned above. The modified vector is defined as:

$$[K_p']=K_b^{-1} \cdot ([IC_{cs}] \cdot [K_{cs}]-[T_{xc}] \cdot [IC_s] \cdot [K_s] \cdot [T_{xm}]) \cdot [X_d]+[X_p]$$

where $[X_p']$ is the modified vector of required average actuator positions
$[X_p]$ is the modal vector of required average actuator positions
$[X_d]$ is the vector of actuator modal positions
$[IC_{cs}]$ is the diagonal matrix of simulated actuator dampings
$[IC_s]$ is the diagonal matrix of simulated modal dampings
$[K_{cs}]$ is the diagonal matrix of simulated actuator stiffness
$[K_s]$ is the diagonal matrix of simulated modal stiffness
$[T_{xc}]$ is the position actuator transformation matrix
$[T_{xm}]$ is the position modal transformation matrix
$K_b$ is the actuator position error loop gain The required actuator positions are determined from the actuator force correction terms, taking into consideration the simulated stiffnesses and damping.

The modified vector of required actuator positions can be written as follows:

$$[X_p'] = [W_{xc}] \cdot [X_d] + [X_p]$$

with $[W_{xc}] = K_d^{-1} \cdot ([IC_{cs}] \cdot [K_{cs}] - [T_{xc}] \cdot [IC_s] \cdot [K_s] \cdot [T_{xm}]) \cdot [X_d] + [X_p]$ It will be seen that the co-efficients of $[W_{xc}]$ are constant and can therefore be calculated.

The foregoing specific description obviously gives a preferred embodiment of the invention. The essence of the invention is the realisation that an active suspension unit can be formed of several independent units, with the control system distributed throughout the units, so that a plurality of units actually calculates from measured input the control signal should be output to the actuators of the suspension system.

We claim:

1. A vehicle suspension system comprising:
   at least one vehicle suspension device attachable to a vehicle body and a wheel and at least one wheel and hub assembly for controlling displacement of the wheel and hub assembly relative to the vehicle body comprising:
   hydraulic actuator means,
   first attachment means connected to the hydraulic actuator means for attaching the hydraulic actuator means to the wheel and hub assembly,
   second attachment means connected to the hydraulic actuator means for attaching the hydraulic actuator means to the vehicle body,
   force measuring means for measuring force transmitted from the wheel and hub assembly to the vehicle body through the hydraulic actuator means when said hydraulic actuator means is attached by said first attachment means to the wheel and hub assembly and by said second attachment means to the vehicle body, the force measuring means generating a signal representative of the measured force,
   displacement measuring means for measuring extension and contraction of the hydraulic actuator means and for generating a signal representative of the measured extension and contraction,
   an electro-hydraulic servo-valve connected to the hydraulic actuator means and controllable by an electrical control input signal and connectable to fluid supply and return lines, and
   first control means for processing the signals produced by the force measuring means and the displacement measuring means and for generating a first control signal for controlling the electro-hydraulic servo-value, the first control signal controlling the electro-hydraulic servo-valve to regulate flow of fluid to and from the hydraulic actuator means and thereby controlling the extension and contraction of the hydraulic actuator means;
   second control means for generating a second control signal and located in the vehicle body; and
   first connection means for connecting the vehicle suspension device to the second control means, the first connection means being operable to connect the force measuring means, the displacement measuring means and the first control means to the second control means;
   wherein the first control means, the electro-hydraulic servo-valve, the hydraulic actuator means, the displacement measuring means and the force measuring means are all included in an autonomous exchangeable unit,
   wherein the first control means, the electro-hydraulic servo-valve, the hydraulic actuator means, the displacement measuring means and the force measuring means together constitute means for simulating an independent spring and damper arrangement connected between the vehicle body and the wheel and hub assembly, the first control means using control algorithms to simulate the independent spring and damper arrangement and generating the first control signal which demands an extension of the hydraulic actuator means which is on average constant, and
   wherein the first control means, the electro-hydraulic servo-valve, the hydraulic actuator means, the displacement measuring means and the force measuring means also constitute part of means for simulating modal springs and dampers for the vehicle when connected by the first connection means to the second control means;
   wherein the vehicle suspension device further comprises means for combining the first control signal with the second control signal, and received via the first connection means, and responsively generating the electrical control input signal in such a way that the average extension of the hydraulic actuator means can be controlled by the second control signal.

2. A vehicle suspension system as claimed in claim 1 further comprising measuring means for measuring acceleration of the wheel and hub assembly towards and away from the vehicle body and for generating a wheel acceleration signal indicative of the measured acceleration of the wheel and hub assembly, wherein the first control means processes the wheel acceleration signal and modifies the first control signal for the electro-hydraulic servo-valve with changes in the wheel acceleration signal.

3. A vehicle suspension system as claimed in claim 1 comprising a plurality of the vehicle suspension devices each attachable between the vehicle body and one of a plurality of the wheel and hub assemblies,
   wherein the vehicle suspension system further comprises vehicle acceleration measuring means located within the vehicle body for measuring vehicle acceleration and for generating a vehicle acceleration signal representative of the measured acceleration, and
   wherein the second control means is for controlling extension and contraction of the actuator means of the vehicle suspension devices, the second control means comprising:
   a processor which processes the force signal generated by the force measuring means of each vehicle suspension device and which processes the vehicle acceleration signal, the processor generating the second control signal for controlling the extension and contraction of the hydraulic actuator means of each of the plurality of vehicle suspension devices.

4. A vehicle suspension system as claimed in claim 3 wherein the acceleration measuring means for measuring the vehicle acceleration include means for measuring acceleration of the vehicle parallel to a principal axis of the vehicle, and means for measuring acceleration of the vehicle perpendicular to the principal axis.

5. A vehicle suspension system as claimed in claim 3 further comprising measuring means for measuring rate of rotation of the vehicle about a selected point on the vehicle body and for producing a rate of rotation signal representative of the measured rate of rotation, wherein the processor of the second control means alone processes the rate of rotation signal.

6. A vehicle suspension system as claimed in claim 3 wherein the processor of the second control means processes the force signals to generate modal signals representative of forces which act to cause one or more of the heave, pitch, roll, and warp modes of vehicle movement, the processor of the second control means processing the modal signals to generate the second control signal for controlling the extension and the contraction of the hydraulic actuator means of each of the plurality of vehicle suspension devices.

* * * * *

UNITED STATES PATENT AND TRADEMARK OFFICE
CERTIFICATE OF CORRECTION

PATENT NO. : 5,590,898
DATED : January 7, 1997
INVENTOR(S) : David A. Williams et al.

It is certified that error appears in the above-indentified patent and that said Letters Patent is hereby corrected as shown below:

Col. 8, line 11, change "$X_o X_d + X_b$" to --$X_o = X_d + X_b$--.

Col. 10, line 46, change "$[K_p'] = K_b^{-1} \cdot ([IC_{cs}] \cdot [K_{cs}] - [T_{xc}] \cdot [IC_s] \cdot [K_s] \cdot [T_{xm}]) \cdot [X_d] + [X_p]$" to --$[X_p'] = K_b^{-1} \cdot ([IC_{cs}] \cdot [K_{cs}] - [T_{xc}] \cdot [IC_s] \cdot [K_s] \cdot [T_{xm}]) \cdot [X_d] + [X_p]$--

Col. 11, line 48, change "servo-value" to --servo-valve--.

Signed and Sealed this

Twenty-eighth Day of October, 1997

Attest:

*Attesting Officer*

BRUCE LEHMAN

*Commissioner of Patents and Trademarks*